(12) United States Patent
Edara

(10) Patent No.: US 9,014,703 B1
(45) Date of Patent: Apr. 21, 2015

(54) NOTIFICATION TO MOBILE DEVICE OF INCOMING CALL

(75) Inventor: Kiran K. Edara, Cupertino, CA (US)

(73) Assignee: Amazon Technologies, Inc., Reno, NV (US)

(*) Notice: Subject to any disclaimer, the term of this patent is extended or adjusted under 35 U.S.C. 154(b) by 161 days.

(21) Appl. No.: 13/211,221

(22) Filed: Aug. 16, 2011

(51) Int. Cl.
H04W 40/00 (2009.01)
H04W 72/00 (2009.01)
H04W 28/10 (2009.01)

(52) U.S. Cl.
CPC .................................... H04W 28/10 (2013.01)

(58) Field of Classification Search
USPC ........ 455/418–422.1, 432.1–455, 464, 550.1, 455/552.1, 553.1, 556.1–557; 370/310.2, 370/328, 338, 351–360, 465–467
See application file for complete search history.

(56) References Cited

U.S. PATENT DOCUMENTS

| 2006/0252369 | A1* | 11/2006 | Rasanen | 455/39 |
| 2007/0042777 | A1* | 2/2007 | Govindarajan et al. | 455/435.2 |
| 2007/0217411 | A1* | 9/2007 | Danzeisen et al. | 370/389 |
| 2008/0313543 | A1* | 12/2008 | Altberg et al. | 715/730 |
| 2009/0262668 | A1* | 10/2009 | Hemar et al. | 370/260 |

* cited by examiner

Primary Examiner — San Htun
(74) Attorney, Agent, or Firm — Lowenstein Sandler LLP

(57) ABSTRACT

A user device receives a notification, via a first radio access technology (RAT), of an incoming user communication on a second RAT, and turns on a receiver associated with the second RAT. The user device then establishes a connection with a corresponding cell at its current location to receive the incoming user communication.

25 Claims, 9 Drawing Sheets

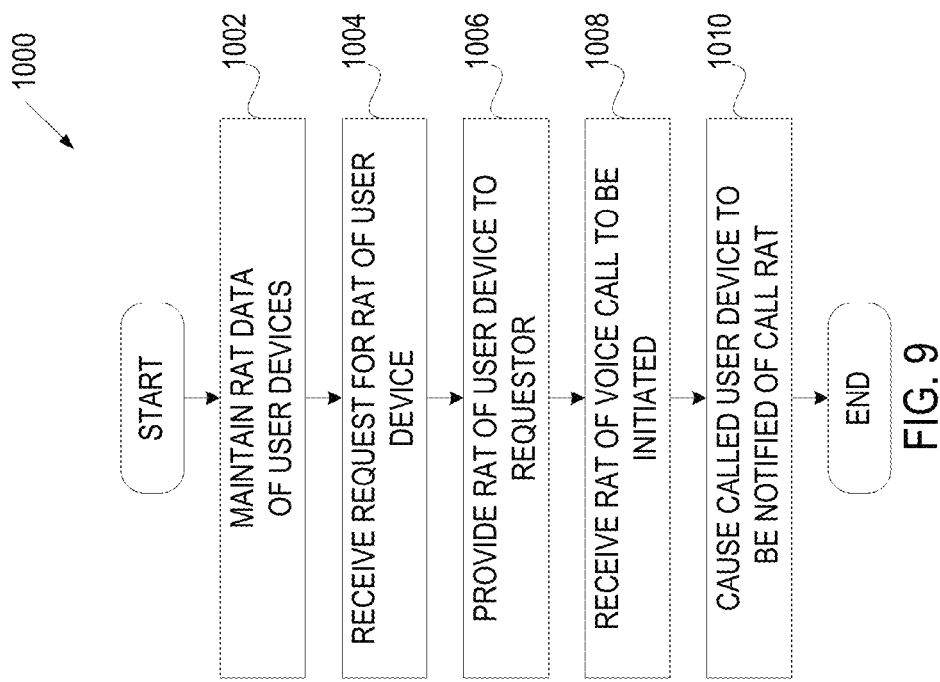
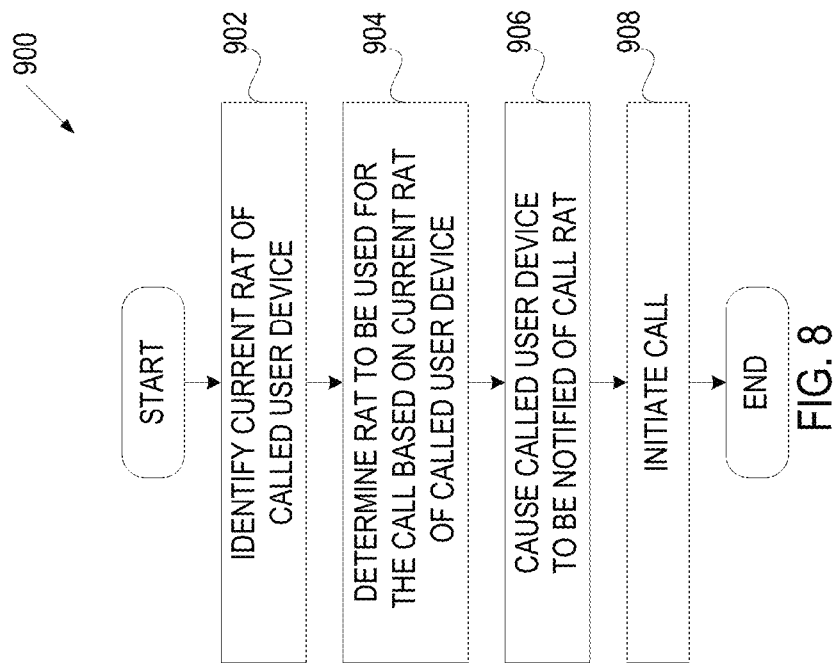

NOTIFICATION TO MOBILE DEVICE OF INCOMING CALL

BACKGROUND

Most current mobile devices support multiple radio access technologies (RATs) including, for example, Wifi, Global Systems for Mobile Communications (GSM), Code-Division Multiple Access (CDMA), Universal Mobile Telecommunications Systems (UMTS), 3GPP Long Term Evaluation (LTE), and Worldwide Interoperability for Microwave Access (WiMAX). In particular, a user device may receive communications via more than one RAT. For example, a mobile device may be able to receive voice calls via WiFi, as well as GSM or CDMA. Typically, when such a mobile device has network connectivity via WiFi, it still has its CDMA receiver turned on to be able to receive incoming voice calls via CDMA. This requires additional processing power and results in extra current drain.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 8 is a flow diagram of one embodiment of a method for initiating a voice call.

FIG. 9 is a flow diagram of one embodiment of a method for a cloud notification to a user device of an incoming voice call.

DETAILED DESCRIPTION

Methods and systems for notifying user devices of incoming calls are disclosed. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity. Network connection may be enabled via various radio access technologies (RATs) including, for example, Wifi, GSM, CDMA, UMTS, LTE and WiMAX. To support multiple RATs, a user device may include multiple RAT receivers. For example, a user device may include a WiFi receiver supporting access point communication systems (e.g., WiFi), a 2G receiver supporting second generation (2G) communication systems (e.g., GSM or CDMA), a 3G receiver supporting third generation (3G) communication systems (e.g., Universal Mobile Telecommunications Systems (UMTS), GSM or CDMA2000), and a 4G receiver supporting fourth generation (4G) communication systems (e.g., LTE, WiMAX).

In one embodiment, a user device receives a notification of an incoming user communication (e.g., an incoming voice call or an incoming message) to be initiated on a RAT for which the user device does not have a RAT receiver turned on. The incoming voice call may be, for example, a voice over IP (VoIP) call or a circuit switched call. The incoming message can be, for example, a text message such as a Short Message Service (SMS) message or a multimedia message such as a Multimedia Messaging Service (MMS) message. In response to the notification, the user device turns on a RAT receiver associated with the RAT to be used for the incoming user communication, identifies a corresponding cell, and registers with this cell to be able to receive the incoming voice call or message. The user device may receive the notification of the RAT from a server communicatively connected to the user device.

Accordingly, a user device no longer needs to perform continuous monitoring for voice and/or data communications on different RATs simultaneously. Rather, a user device can turn off a receiver associated with one RAT (e.g., a 3G receiver) when the user device has voice and/or data connectivity via another RAT (e.g., WiFi). This leads to improved performance and reduced current drain of the user device's battery.

Figure 1:
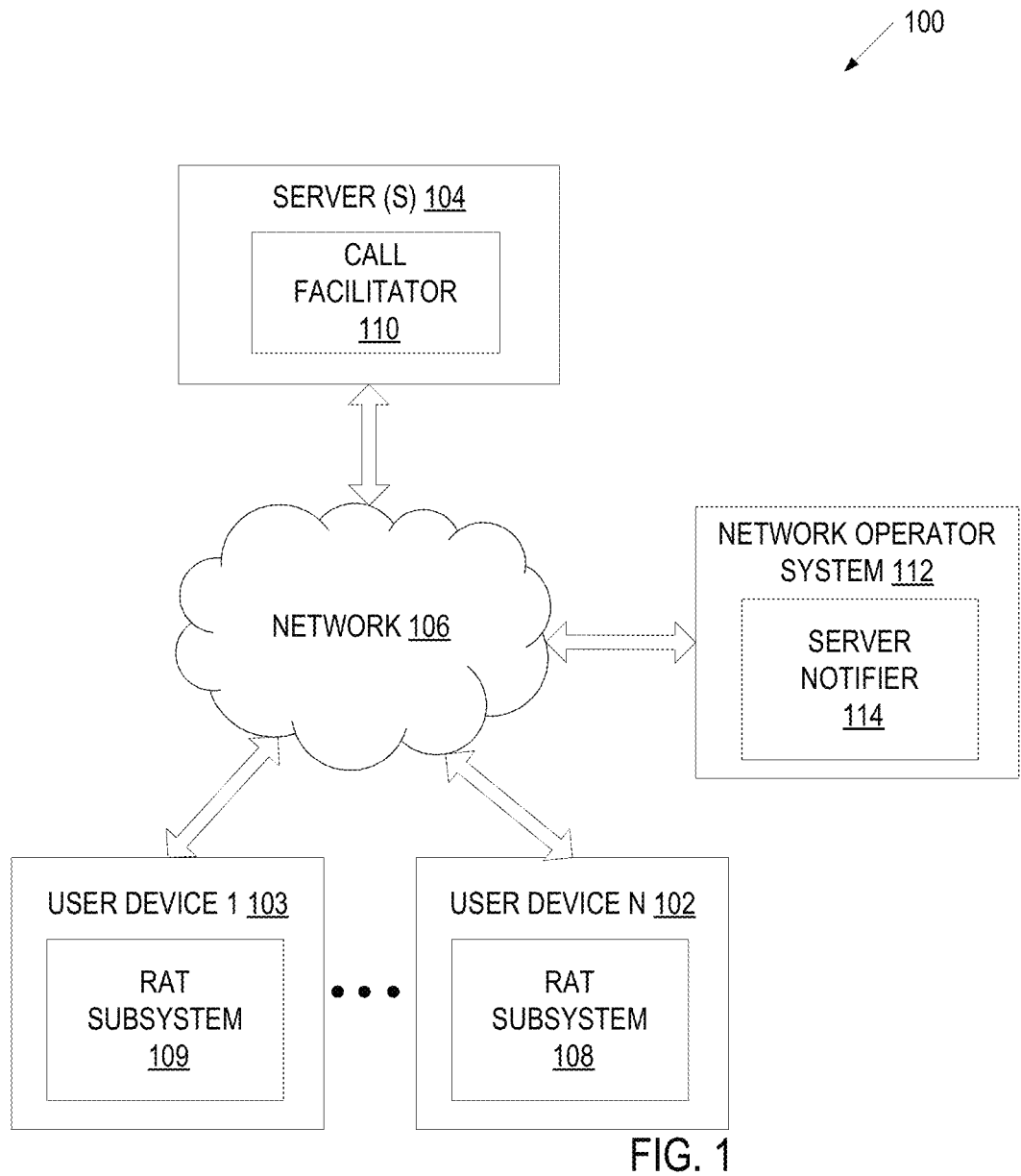
FIG. 1 is a block diagram of an exemplary network architecture in which embodiments of the invention may operate.

FIG. 1 is a block diagram of exemplary network architecture 100 in which embodiments of the invention may operate. The network architecture 100 may include one or more servers 104 and multiple user devices 102, 103 coupled to the server(s) 104 via a network 106 (e.g., public network such as the Internet or private network such as a local area network (LAN)).

The user devices 102, 103 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102, 103 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a cloud server, a content provider server, a network operator server, or any other server that provides various services to user devices 102, 103 via the network 106. A cloud server may be part of a cloud computing platform providing computing resources, storage resources and/or networking resources to users of the user devices 102. In one embodiment, the sever 104 downloads items, upgrades, and/or other information to the user devices 102, 103 via the network 106. The server 104 also receives various requests, instructions and other data from the user devices 102, 103 via the network 106. The server 104 may include one or more machines (e.g., one or more server computer systems, routers, gateways) that have processing and storage capabilities to provide the above functionality. In some embodiments, the network architecture 100 includes multiple servers 104, each associated with a group of user devices. For example, one server 104 may be an Elastic Compute Cloud (EC2™) server providing service to a user device 102 and another server may be another EC2 instance, some other cloud computing service, or some other server providing service to a user device 103.

Communication between the server 104 and a user device 102, 103 may be enabled via any communication infrastructure. One example of such an infrastructure includes a combination of a wide area network (WAN) or a VPN and wireless infrastructure, which allows a user to use the user device 102, 103 to purchase items and consume items without being tethered to the server 104 via hardwired links. The wireless infrastructure may be provided by a network operator system 112 that can be implemented using various data processing equipment, communication towers, etc. Alternatively, or in addition, the network operator system 112 may rely on satellite technology to exchange information with the user device 102. Yet alternatively, or in combination, the wireless infrastructure may be provided by an access point (e.g., WiFi access point) provider system. The system 112 may represent a network operator system or an access point provider system or a combination of both.

The communication infrastructure may also include a communication-enabling system that serves as an intermediary in passing information between the server 104 and the wireless network operator system 112. The communication-enabling system may communicate with the wireless network operator system 112 via a dedicated channel, and may communicate with the server 104 via a non-dedicated communication mechanism, e.g., a public network such as the Internet.

The server 104 may pay the network operator a fee based on the aggregate use of the network operator system by all of the user devices 102, 103. The server 104 may recoup these costs through fees charged to the end-users separately or as part of other purchases (e.g., purchase of digital content) made by the end-users. Alternatively, the network operator may submit bills directly to individual users, or may submit bills to either the server 104 (in aggregate) or to the individual users, at the option of the individual respective users.

A user device 102, 103 may receive data and/or voice communications on various RATs using corresponding RAT receivers. In one embodiment, a user device 102 includes a RAT subsystem 108 that allows the user device 102 to avoid continuous monitoring for voice and/or data communications on different RATs simultaneously. In particular, the RAT subsystem 108 may receive voice and data communications on a specific RAT (e.g., WiFi) using a corresponding RAT receiver. When the user device 102 is about to receive an incoming communication (a voice call or a message) on a different RAT, the RAT subsystem 108 of the user device 102 receives a notification of the incoming voice call or message, specifying the RAT that will be used for the incoming voice call or message. In response, the RAT subsystem 108 turns on a RAT receiver associated with the RAT to be used for the incoming voice call or message, identifies a cell corresponding to this RAT, and registers with or connects to the identified cell (camps on the identified cell) to be able to receive the incoming voice call or message. The RAT subsystem 108 receives the notification from the server 104.

In some embodiments, in which the devices 102 and 103 are communicatively connected to the same server 104, a RAT subsystem 109 of the user device 103 may communicate with the server 104 to provide the RAT to be used for the voice call or message to the server 104. The server 104 may host a call facilitator 110 that receives the RAT to be used for the voice call or message from the RAT subsystem 109 and provides a notification of this RAT to the user device 102 via the RAT currently used by the user device 102. For example, the user device 102 may be connected to the server (EC2 server) 104 via WiFi and the user device 103 may be connected to the server 104 via CDMA2000 (1xRTT, 1xEV-DO, 1xEV-DV). When the user device 103 is about to initiate a voice call or message to the user device 102 on 3G, the user device 103 informs the server 104 about this, and the server 104 sends a notification to the user device 102, indicating that the user device 102 should prepare for the incoming voice call or message on 3G. The user device 102 then turns on the 3G receiver and camps on a 3G cell to be able to receive the incoming voice call or message from the user device 103.

In other embodiments, in which the devices 102 and 103 are communicatively connected to different servers 104 (servers A and B respectively, not shown), a RAT subsystem 109 of the user device 103 may communicate with server B to provide the RAT to be used for the voice call to server B. Server B may host a call facilitator 110 that receives the RAT to be used for the voice call to the user device 102 from the RAT subsystem 109, determines that the user device 102 is associated with server A, and informs a call facilitator 110 of server A about the voice call and the RAT to be used for this voice call. The call facilitator 110 of server A then provides a notification of this RAT to the user device 102 via the RAT currently used by the user device 102. For example, the user device 102 may be connected to Cloud Server A via WiFi and the user device 103 may be connected to Cloud Server B server via /CDMA2000 (1xRTT, 1xEV-DO, 1xEV-DV). When the user device 103 is about to initiate a voice call to the user device 102 on 3G, the user device 103 informs the Cloud Server B about this, and Cloud Server B notifies Cloud Server A about the voice call to the user device 102 and the RAT to be used for this call. Cloud Server A then sends a notification to the user device 102, indicating that the user device 102 should prepare for the incoming voice call on 3G. The user device 102 then turns on the 3G receiver and camps on a 3G cell to be able to receive the incoming voice call from the user device 103.

In yet other embodiments, the user device 103 may initiate a voice call or message to the user device 102 via the network operator system 112. A server notifier 114 hosted by the network operator system 112 may inform a network operator server 104 (e.g., a private cloud server of a network operator) about the voice call or message to the user device 102 and the RAT used for this call. In response, the call facilitator 110 of the server 104 provides a notification of this RAT to the user device 102 via the RAT currently used by the user device 102. For example, the user device 102 may be connected to the network operator server via 2G. When the user device 103 initiates a voice call to the user device 102 on 3G, the network operator system 112 informs its cloud server about this. The cloud server then sends a notification to the user device 102, indicating that the user device 102 should prepare for the incoming voice call on 3G. The user device 102 then turns on the 3G receiver and camps on a 3G cell to receive the incoming voice call from the user device 103.

In some embodiments, the user device 102 includes multiple physical RAT receivers for different RATs. In other embodiments, the user device 102 may include a single physical RAT receiver that can be programmatically re-programmed for a specific RAT. In yet other embodiments, the user device 102 may include two or more physical RAT receivers, where each physical RAT receiver can be programmatically re-programmed for a specific subset of RATs.

Figure 2:
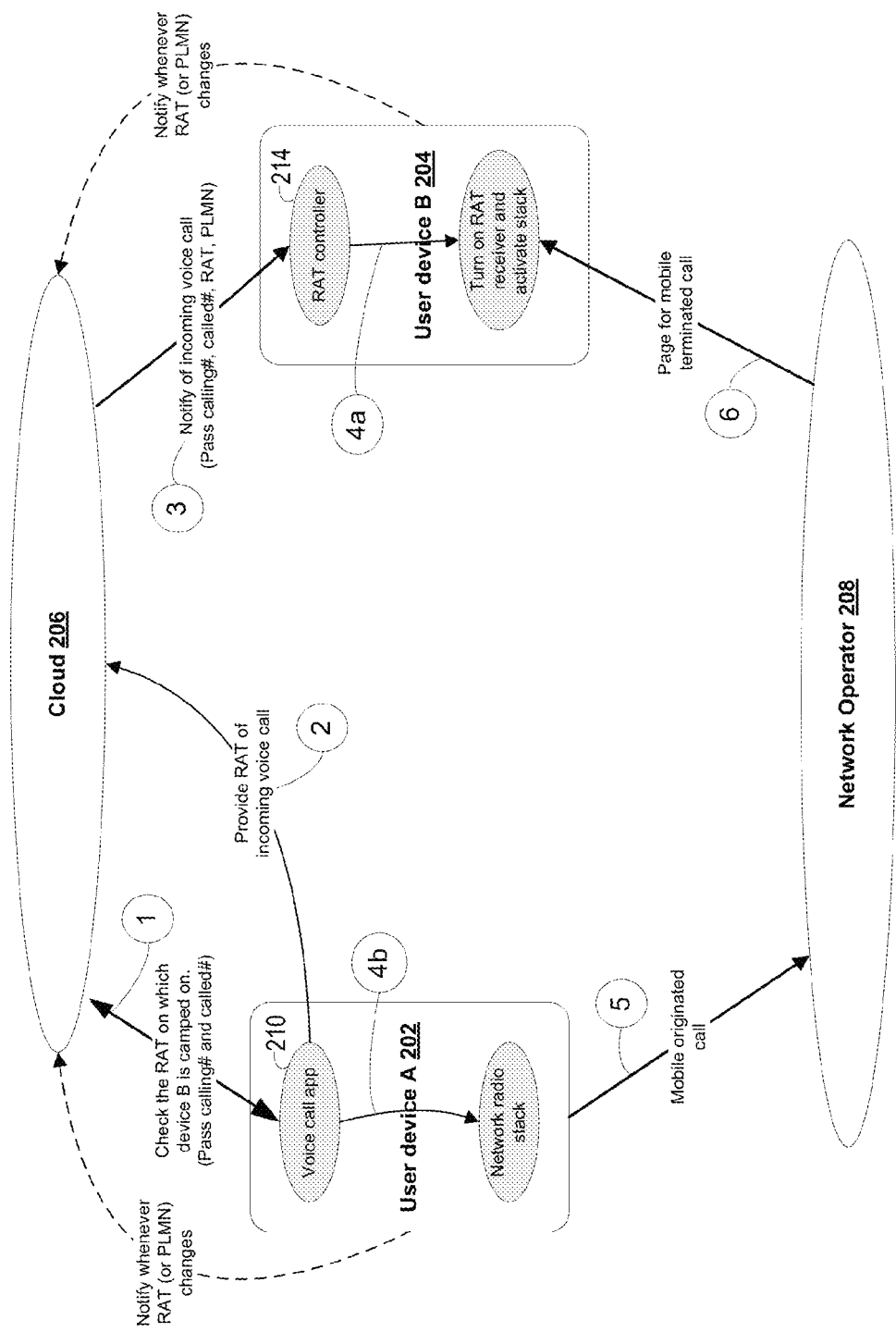
FIG. 2 illustrates one embodiment of a mechanism for facilitating a voice call between user devices coupled to a common cloud using cloud-based notification of the voice call.

FIG. 2 illustrates one embodiment of a mechanism for facilitating a voice call between user devices coupled to a common cloud using cloud-based notification of the voice call. Referring to FIG. 2, user devices 202 and 204 are communicatively connected to cloud 206. The cloud 206 (or more specifically a server associated with a cloud service) may be aware of IP addresses of user devices 202, 204 and whether the user devices 202, 204 have an active connection with the cloud 206. In addition, in one embodiment, the user devices 202, 204 notify the cloud 206 when their current RAT and/or their current network (e.g., public land mobile network (PLMN)) changes. The cloud 206 stores this information and is aware of a current RAT and a current PLMN of each user device 202, 204. It should be noted that the PLMN may be provided for network communication systems such as CDMA, UMTS, GSM, LTE and WiMAX but not for access point (e.g., WiFi) communication systems.

In some embodiments, user devices 202, 204 also notify the cloud 206 if they do not want to accept any voice calls or will accept only high priority voice calls (e.g., from close family)—some sort of "no calls right now" or "high priority calls only". When the user device 202 requests from the cloud 206 the current RAT of the user device 204, the cloud 206 can also provide the information regarding the current status of the user device 204 on receiving calls. Depending on the current status of the user device 204, the user device 202 may choose to not initiate a voice call to the user device 204 at all.

In one embodiment, the following set of operations is performed to facilitate a voice call from the user device 202 to the user device 204. First, when the user device 202 is about to initiate a voice call to the user device 204, a voice call application 210 of the user device 202 requests a current RAT of the user device 204 from the cloud 206. The request may include the identifier (e.g., phone number) of the calling user device and the identifier (e.g., phone number) of the called user device. Upon receiving the RAT of the user device 204 from the cloud 206, the voice call application 210 of the user device 202 may determine what RAT should be used for the voice call to be initiated. In particular, the voice call application 210 may determine what RAT will be more cost efficient, will result in faster or better service, etc. For example, the voice call application 210 may decide to initiate a VoIP call instead of a circuit switched call to save subscriber plan minutes. In another example, the voice call application 210 may decide to use the RAT that is currently used by the user device 204 to be able to achieve faster service. In some embodiments, the voice call application 210 may decide not to initiate a voice call to the user device 204, and may instead invoke a text or email message application to send a text message or an email message to the user device 204 (e.g., if the user device 204 is not connected to a circuit switched service or is currently out of service as specified by the cloud 206 in response to the request of the user device 202 for a RAT of the user device 204).

Once the voice call application 210 identifies the RAT of the voice call, the voice call application 210 provides the identified RAT to the cloud 206 (operation 2). In an alternative embodiment, the voice call application 210 does not request the RAT of the user device 204 (does not perform operation 1). Rather, the voice call application 210 may decide to use its own active RAT or some other RAT (e.g., a more cost efficient RAT, RAT used during a previous voice call to the user device 204, etc.) and may provide this RAT to the cloud 206, along with the phone number of the user device 204. In yet another embodiment (not shown), the cloud 206 itself may decide what RAT should be used for the voice call (e.g., based on the RAT used in a recent voice call between the user device 204 and some other user device) and may notify the user device 202 about this RAT.

Next, the cloud 206 sends a notification of the incoming voice call to the user device 204 (operation 3). The notification may include the number of the calling user device, the number of the called user device, the RAT to be used for the incoming voice call and a PLMN associated with a network operator 208 that currently provides service to the user device 202.

A RAT controller 214 of the user device 204 may receive the notification and determine if a corresponding RAT receiver is turned on. If not, the RAT controller 214 turns the RAT receiver on, identifies a corresponding cell, camps on the identified cell and activates a network stack associated with the PLMN specified in the notification (operation 4a). In one embodiment, the RAT controller 214 identifies the corresponding cell by searching a local store for a cell available at the current location of the user device 204 and corresponding to the specified PLMN. If the local store includes data identifying such a cell, the user device 204 camps on this cell. If the local store does not include data identifying such a cell, the user device 204 performs a PLMN scan to find a cell available at the current location of the user device 204 and corresponding to the PLMN specified in the notification, and then camps on the found cell.

In parallel with operation 4a performed by the user device 204, the user device 202 may activate a network stack associated with the network operator 208 (operation 4b). Next, the user device 202 initiates a voice call via the network operator 208 (e.g., using the GSM mobile originated call flow) (operation 5). The network operator 208 then sends a page to the user device 204 to inform the mobile device 204 of the incoming voice call (e.g., using the GSM mobile terminated call flow) (operation 6). In response, the user device 204 performs call setup with the user device 202 to respond to the incoming voice call.

In one embodiment, when the user device 204 turns on the receiver associated with the RAT of the incoming voice call, the user device 204 turns off the other active RAT receiver. In another embodiment, the user device 204 does not turn off the other active RAT receiver until the incoming voice call is ended. In yet another embodiment, the user device 204 determines whether to turn off the other active RAT receiver based on the corresponding RAT and/or PLMN and whether they support simultaneous voice and data communications or only voice communications. For example, if the other active RAT receiver is a WiFi receiver and the incoming voice call uses 3G and an AT&T PLMN, then the user device 204 may turn off the WiFi receiver because AT&T supports simultaneous voice and data communications on its 3G networks. However, if the other active RAT receiver is a WiFi receiver and the incoming voice call uses 2G or 3G and a Verizon PLMN, then the user device 204 may keep the WiFi receiver because Verizon does not support simultaneous voice and data communications on its 2G or 3G networks.

As opposed to an existing mechanism that involves continuous monitoring on multiple RATs simultaneously, embodiments of the present invention may cause a delay in getting a called user device ready for the incoming voice call. This delay may be due to the time needed to turn on an appropriate receiver, find a corresponding cell and camp on the corresponding cell. The delay may be reduced by recording cell data found during PLMN scans and maintaining a local store with up-to-date cell data as discussed above. In addition, in some embodiments, inactive RAT receivers may be periodically turned on for monitoring and/or for identifying available cells and storing the identified cell data in the local data store. Inactive RAT receivers may be turned on at predefined time intervals or upon an occurrence of a certain event such as change in the location of a user device by a predefined threshold. The frequency of turning inactive receivers on may vary for different RATs. For example, a 3G cell is typically larger than a WiFi hotspot. Hence, while a user device is camped on the same WiFi hotspot, it is unlikely that a 3G cell will change (unless in a rare case where a WiFi hotspot is on the border of two 3G cells), and therefore the user device can turn on receivers of other RATs very infrequently.

In addition or alternatively, in some embodiments, a network operator system may be configured to increase the call setup time to compensate for the delay. For example, the network operator may page the called user device regarding an incoming voice call an increased number of times (e.g., 6 times instead of typical 3 times) before proceeding with the termination of the incoming voice call.

Figure 3:
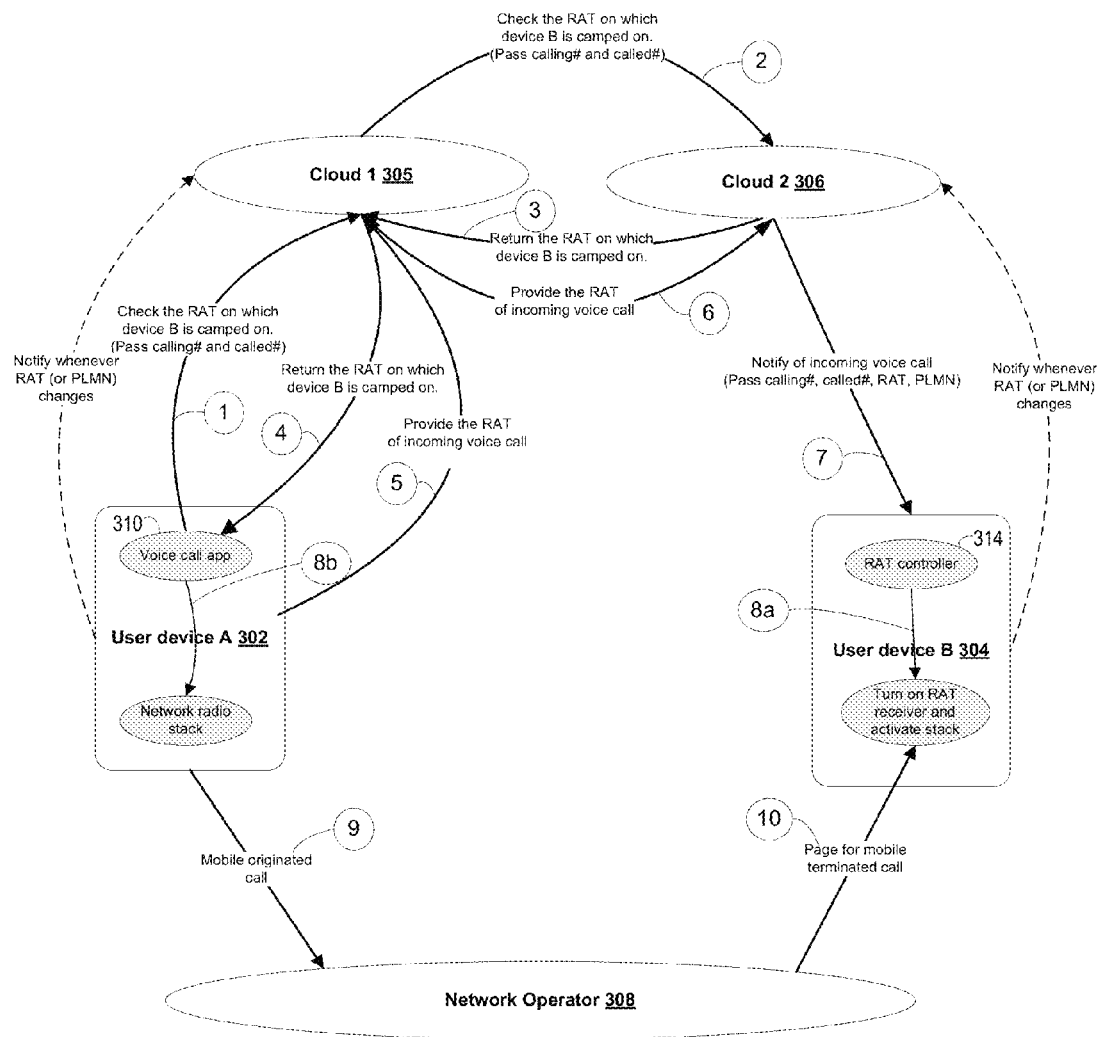
FIG. 3 illustrates one embodiment of a mechanism for facilitating a voice call between user devices coupled to different clouds using cloud-based notification of the voice call.

FIG. 3 illustrates one embodiment of a mechanism for facilitating a voice call between user devices coupled to different clouds using a cloud-based notification of the voice call. Referring to FIG. 3, user devices 202 and 204 are communicatively connected to clouds 305 and 306 respectively. The cloud 305 (or more specifically a server associated with a cloud service) may be aware of the IP address of the user device 302 and whether the user device 302 has an active connection with the cloud 305. The cloud 306 (or more specifically a server associated with a cloud service) may be aware of the IP address of the user device 304 and whether the user device 304 has an active connection with the cloud 306. In addition, in one embodiment, the user devices 302, 304 notify the clouds 305 and 306 respectively when their current RAT and/or their current network (e.g., public land mobile network (PLMN)) changes. The clouds 305, 306 store this information and are aware of current RAT and/or PLMN of user devices 202, 204 respectively.

In one embodiment, the following set of operations is performed to facilitate a voice call from the user device 302 to the user device 304. First, when the user device 302 is about to initiate a voice call to the user device 304, a voice call application 310 of the user device 302 requests a current RAT of the user device 304 from the cloud 305. The request may include the phone number of the calling user device and the phone number of the called user device. The cloud 305 determines that the user device 304 is associated with the cloud 306 and requests the current RAT of the user device 304 from the cloud 306 (operation 2). The cloud 306 returns the current RAT of the user device 304 to the cloud 305 (operation 3), which then returns it to the voice call application 310.

Upon receiving the RAT of the user device 304 from the cloud 305, the voice call application 310 may determine what RAT should be used for the voice call to be initiated. In particular, the voice call application 310 may determine what RAT will be more cost efficient, will result in faster or better service, etc. For example, the voice call application 310 may decide to initiate a VoIP call (e.g., Skype) instead of a circuit switched call (e.g., AT&T) to save AT&T minutes. In another example, the voice call application 310 may decide to use the RAT that is currently used by the user device 304 to be able to achieve faster service. In some embodiments, the voice call application 310 may decide not to initiate a voice call to the user device 304, and may instead invoke a text or email message application to send a text message or an email message to the user device 304 (e.g., if the user device 304 is not connected to a circuit switched service or is currently out of service as specified by the cloud 305 based on the response received from the cloud 306 in operation 3).

Once the voice call application 310 identifies the RAT of the voice call, the voice call application 310 provides the identified RAT to the cloud 305 (operation 5), which in turn sends it to the cloud 306. In an alternative embodiment, the voice call application 310 does not request the RAT of the user device 304 (i.e., operations 1 through 4 are skipped). Rather, the voice call application 310 may decide to use its own active RAT or some other RAT (e.g., a more cost efficient RAT, RAT used during a previous voice call to the user device 204, etc.) and may provide this RAT to the cloud 305, along with the phone number of the user device 304.

Next, the cloud 305 provides the RAT to be used for the incoming voice call to the cloud 306 (operation 6), and the cloud 306 sends a notification of the incoming voice call to the user device 304 (operation 7). The notification may include the number of the calling user device, the number of the called user device, the RAT to be used for the incoming voice call and a PLMN associated with a network operator 308 that currently provides service to the user device 302.

A RAT controller 314 of the user device 304 may receive the notification and determine if a corresponding RAT receiver is turned on. If not, the RAT controller 314 turns the RAT receiver on, identifies a corresponding cell, camps on the identified cell and activates a network stack associated with the PLMN specified in the notification (operation 8a). In one embodiment, the RAT controller 314 identifies the corresponding cell by searching a local store for a cell available at the current location of the user device 304 and corresponding to the specified PLMN. If the local store includes data identifying such a cell, the user device 304 camps on this cell. If the local store does not includes data identifying such a cell, the user device 304 performs a PLMN scan to find a cell available at the current location of the user device 304 and corresponding to the PLMN specified in the notification, and then camps on the found cell.

In parallel with operation 8a performed by the user device 304, the user device 302 may activate a network stack associated with the network operator 308 (operation 8b). Next, the user device 302 initiates a voice call with the network operator 308 (e.g., using the GSM mobile originated call flow) (operation 9). The network operator 308 then sends a page to the user device 304 to inform the mobile device 304 of the incoming voice call (e.g., using the GSM mobile terminated call flow) (operation 10). In response, the user device 304 performs call setup with the user device 302 to respond to the incoming voice call.

In one embodiment, when the user device 304 turns on the receiver associated with the RAT of the incoming voice call, the user device 304 turns off the other active RAT receiver. In another embodiment, the user device 304 does not turn off the other active RAT receiver until the incoming voice call is ended. In yet another embodiment, the user device 304 determines whether to turn off the other active RAT receiver based on the corresponding RAT and/or PLMN and whether they support simultaneous voice and data communications or only voice communications. For example, if the other active RAT receiver is a WiFi receiver and the incoming voice call uses 3G and an AT&T PLMN, then the user device 304 may turn off the WiFi receiver because AT&T supports simultaneous voice and data communications on its 3G networks. However, if the other active RAT receiver is a WiFi receiver and the incoming voice call uses 2G or 3G and a Verizon PLMN, then the user device 304 may keep the WiFi receiver because Verizon does not support simultaneous voice and data communications on its 2G or 3G networks.

Figure 4:
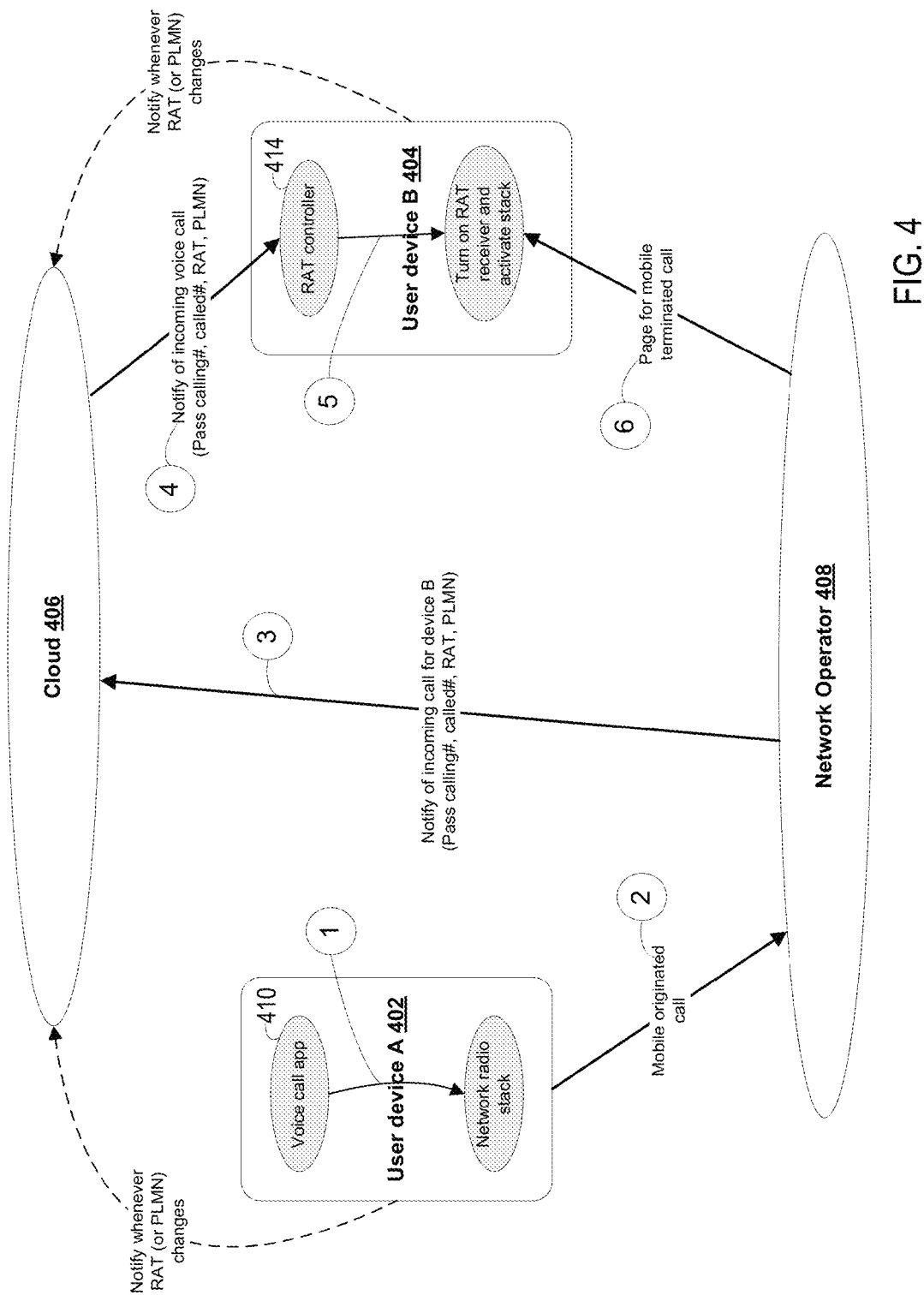
FIG. 4 illustrates one embodiment of a mechanism for facilitating a voice call between user devices using cloud-based notification of the voice call and assistance of a network operator.

FIG. 4 illustrates one embodiment of a mechanism for facilitating a voice call between user devices using cloud-based notification of the voice call and assistance of a network operator. Referring to FIG. 4, user devices 404 and 402 are communicatively connected to cloud 206. The cloud 406 (or more specifically a server associated with a cloud service of a network operator) may be aware of the IP address of the user device 404 and whether the user device 404 has an active connection with the cloud 406. In addition, in one embodiment, the user devices 402 and 404 notify the cloud 406 when their current RAT and/or network (e.g., public land mobile network (PLMN)) changes. The cloud 406 stores this information and is aware of a current RAT and/or PLMN of user devices 402 and 404.

In one embodiment, the following set of operations is performed to facilitate a voice call from the user device 402 to the user device 404. First, a voice call application 410 of the user device 402 may activate a network stack associated with a network operator 408 currently providing service to the user device 402 (operation 1). Next, the user device 402 initiates a voice call with the network operator 408 (e.g., using the GSM mobile originated call flow) (operation 2). The network operator 408 then notifies the cloud 406 of the incoming voice call to the user device 404. The notification may include the phone number of the user device 402, the phone number of the user device 404, and the RAT and PLMN used for the incoming voice call (operation 3).

Next, the cloud 406 sends a notification of the incoming voice call to the user device 404 (operation 4). The notification may include the number of the calling user device, the number of the called user device, the RAT to be used for the incoming voice call and a PLMN associated with the network operator 408.

A RAT controller 414 of the user device 404 may receive the notification and determine if a corresponding RAT receiver is turned on. If not, the RAT controller 414 turns the RAT receiver on, identifies a corresponding cell, camps on the identified cell and activates a network stack associated with the PLMN specified in the notification (operation 5). In one embodiment, the RAT controller 414 identifies the corresponding cell by searching a local store for a cell available at the current location of the user device 404 and corresponding to the specified PLMN. If the local store includes data identifying such a cell, the user device 404 camps on this cell. If the local store does not includes data identifying such a cell, the user device 404 performs a PLMN scan to find a cell available at the current location of the user device 404 and corresponding to the PLMN specified in the notification, and then camps on the found cell.

Further, the network operator 408 sends a page to the user device 404 to inform the mobile device 404 of the incoming voice call (e.g., using the GSM mobile terminated call flow) (operation 6). In response, the user device 404 performs call setup with the user device 402 to respond to the incoming voice call.

In one embodiment, when the user device 404 turns on the receiver associated with the RAT of the incoming voice call, the user device 404 turns off the other active RAT receiver. In another embodiment, the user device 404 does not turn off the other active RAT receiver until the incoming voice call is ended. In yet another embodiment, the user device 404 determines whether to turn off the other active RAT receiver based on the corresponding RAT and/or PLMN and whether they support simultaneous voice and data communications or only voice communications. For example, if the other active RAT receiver is a WiFi receiver and the incoming voice call uses 3G and an AT&T PLMN, then the user device 404 may turn off the WiFi receiver because AT&T supports simultaneous voice and data communications on its 3G networks. However, if the other active RAT receiver is a WiFi receiver and the incoming voice call uses 2G or 3G and a Verizon PLMN, then the user device 404 may keep the WiFi receiver because Verizon does not support simultaneous voice and data communications on its 2G or 3G networks.

Figure 5:
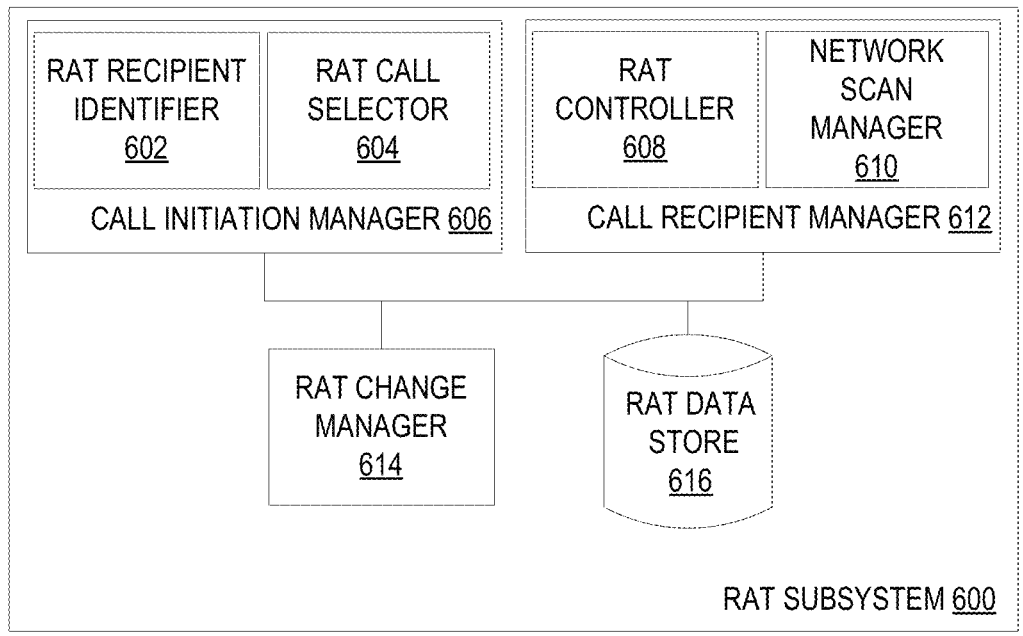
FIG. 5 is a block diagram of one embodiment of a RAT subsystem.

FIG. 5 is a block diagram of one embodiment of a RAT subsystem 600 hosted by a user device. The RAT subsystem 600 may be the same as RAT subsystem 108 of FIG. 1 and may include a call initiation manager 606 having a RAT recipient identifier 602 and a RAT call selector 604, a call recipient manager 612 having a RAT controller 608 and a network scan manager 610, a RAT change manager 614, and a RAT data store 616. The components of the RAT subsystem 600 may represent modules that can be combined together or separated into further modules, according to some embodiments. In some embodiments, the RAT subsystem 600 includes either the call initiation manager 606 or the call recipient manager 612 but not both of them.

The call initiation manager 606 is responsible for initiating voice calls to other user devices. In particular, when the user device is about to initiate a voice call to another user device, the RAT recipient identifier 602 obtains the current RAT of the other user device from a server (e.g., a cloud server) communicatively connected with this user device. The RAT call selector 604 determines what RAT should be used for the voice call based on the current RAT of the other user device and/or various other considerations (e.g., cost efficiency, quality of service, etc.). The RAT selector 604 then notifies the server of the RAT to be used for the voice call. When the RAT corresponds to a network communication system, the RAT selector 604 may also provide a PLMN for the voice call. Further, the RAT selector 604 initiates the voice call to the other user device via a corresponding network operator or an access point provider.

In an alternative embodiment, the RAT recipient identifier 602 does not request the RAT of the other user device. Rather, the RAT call selector 604 may decide to use its currently active RAT or some other RAT (e.g., a more cost efficient RAT, RAT used during a previous voice call to the other user device, etc.) and may provide this RAT to the server or the other user device.

The call recipient manager 612 is responsible for preparing for an incoming voice call and proceeding with call setup for the incoming voice call. In particular, when another user device is about to initiate a voice call with this user device, the RAT controller 608 may receive a notification of an incoming voice call, specifying the RAT and optionally the PLMN that will be used for the incoming voice call. The RAT controller 608 may receive this notification from a server (e.g., a cloud server) communicatively connected with this user device. The RAT controller 608 determines if a corresponding RAT receiver is turned on. If not, the RAT controller 608 turns the RAT receiver on, identifies a corresponding cell or access point hotspot, camps on the identified cell or access point hotspot and waits for a page associated with the incoming voice call. An access point hot spot can be identified by, for example, camping on the strongest accessible WiFi hotspot. Alternatively, if the current RAT supports data services, the current RAT receiver may be used for this communication, without turning on another RAT receiver.

In one embodiment, the RAT controller 608 identifies the corresponding cell by searching the RAT data store 616 for a cell available at the current location of the user device and corresponding to the specified PLMN. If the RAT data store 6161 includes data identifying such a cell, the RAT controller camps on this cell. If the RAT data store does not includes data identifying such a cell, the RAT controller 608 invokes the network scan manager 610 to perform a PLMN scan to find a cell available at the current location of the user device and corresponding to the specified PLMN, and then camps on the found cell. The RAT controller 608 also records the found cell data in the RAT data store 616. Table 1 below illustrates exemplary cell data records that may be stored in the RAT data store 616.

TABLE 1

| RAT | PLMN ID | Freq/ Channel # | Cell ID | RSSI (dBm) | RSCP (dBm) | RSRP (dB) | EcIo (dB) | GPS Coordinates (Longitude, Latitude) |
|---|---|---|---|---|---|---|---|---|
| UMTS | 310-090 | 4362 | 1001200 | −70 | −65 | NA | −5 | 37.319, −122.03 |
| CDMA | 310-012 | 560 | 2001111 | −85 | NA | NA | −12 | 37.455, −122.08 |
| LTE | 310-012 | 5230 | 1002222 | NA | NA | −60 | −5 | NA |
| GSM | 310-090 | 162 | 445556 | −82 | NA | NA | NA | 37.319, −122.03 |

Referring to Table 1, a record may include the RAT, the PLMN identifier, frequency or channel number, the cell identifier, the relative received signal strength (RSSI), the received signal code power (RSCP), the reference signal received quality (RSRP), the ratio of pilot power to total power (EcIo) and GPS coordinates. The RAT data store 616 may represent a single data structure or multiple data structures (tables, databases, repositories, files, etc.) residing on one or more mass storage devices, such as magnetic or optical storage based disks, solid-state drives or hard drives.

In one embodiment, when the RAT controller 608 turns on the receiver associated with the RAT of the incoming voice call, the RAT controller 608 turns off the other active RAT receiver. In another embodiment, the RAT controller 608 does not turn off the other active RAT receiver until the incoming voice call is ended. In yet another embodiment, the RAT controller 608 determines whether to turn off the other active RAT receiver based on the corresponding RAT and/or PLMN and whether they support simultaneous voice and data communications or only voice communications.

The RAT change manager 614 is responsible for detecting that a current RAT or optionally a current PLMN of the user device has changed. For example, the user device may receive service from GSM and then switch to WiFi when a user of the user device enters a building. If the user device is connected to a server (e.g., a cloud server), the RAT change manager 614 may notify the server each time the RAT and/or PLMN of the user device changes. Alternatively or in addition, the RAT change manager 614 may update a local store (e.g., the RAT data store) with the new RAT and/or PLMN of the user device.

Figure 6:
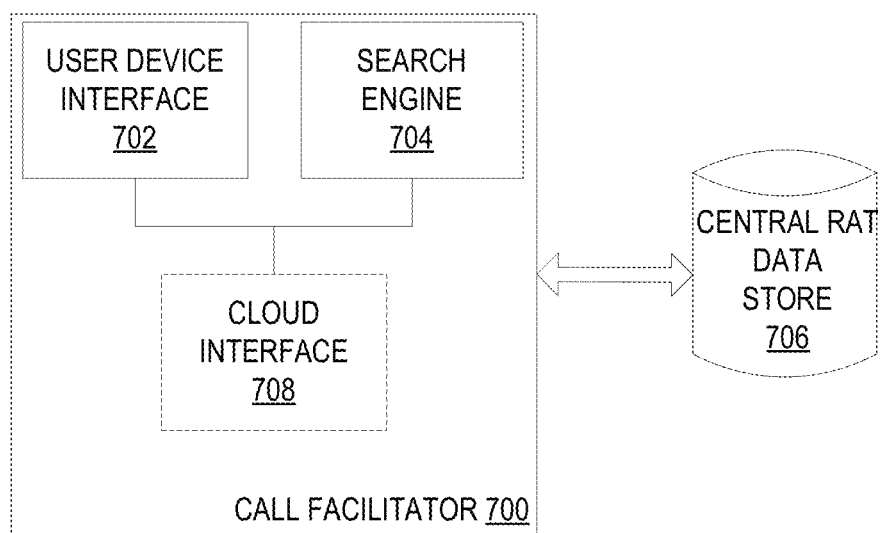
FIG. 6 is a block diagram of one embodiment of a call facilitator.
Figure 7:
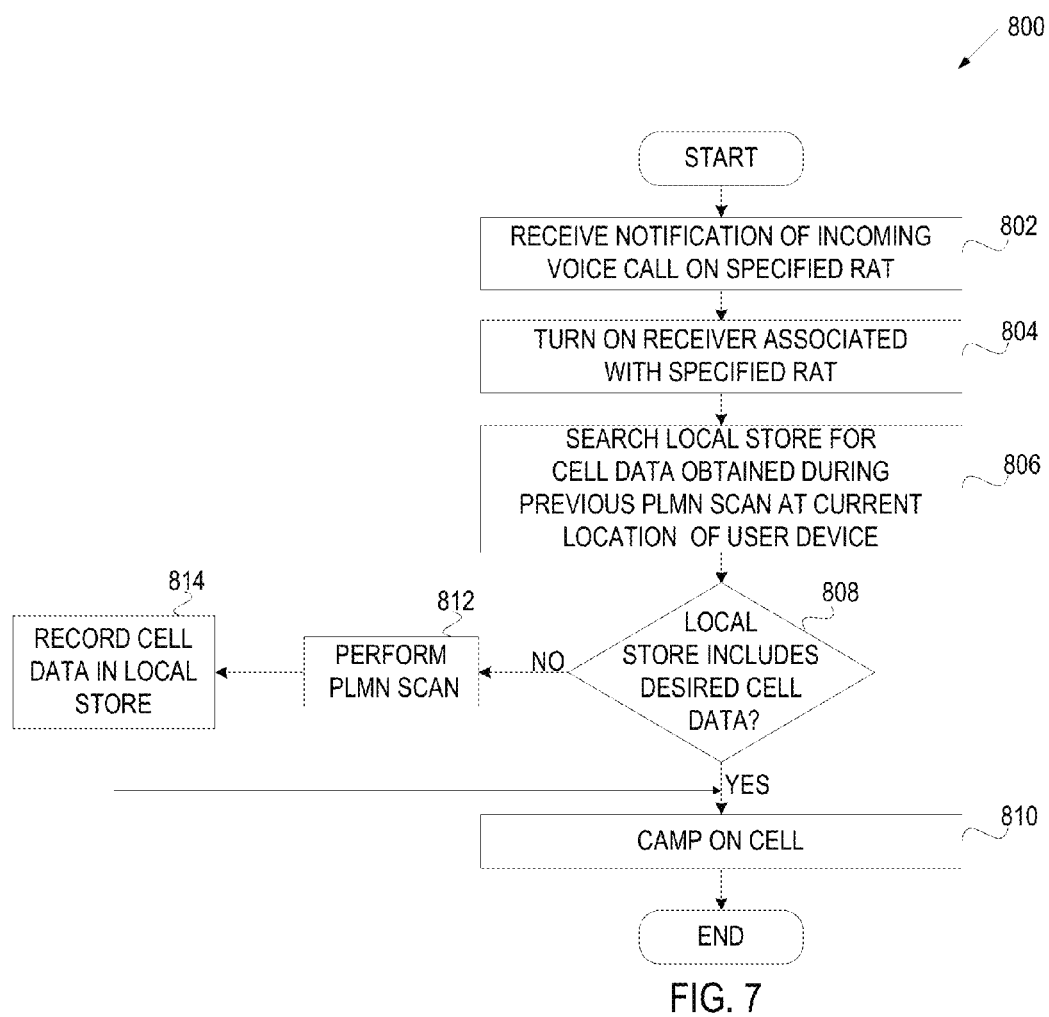
FIG. 7 is a flow diagram of one embodiment of a method for preparing a user device to an incoming voice call.

FIG. 6 is a block diagram of one embodiment of a call facilitator 700 hosted by a server. The call facilitator 700 may be the same as call facilitator 110 of FIG. 1. The call facilitator 700 may include a user device interface 702, a search engine 704, and a central RAT data store 706. The components of the call facilitator 700 may represent modules that can be combined together or separated into further modules, according to some embodiments.

The user device interface 302 receives RAT data from various user devices and stores this data in the central RAT data store 706. RAT data may include an IP address of the user device, a user device identifier such as a user device phone number or international mobile subscriber identity (IMSI), a current RAT of the user device, and a PLMN identifier where applicable. When the RAT or the PLMN of the user device changes, a corresponding record in the central RAT data store 706 may be updated or a new record may be added to the central RAT data store 706. Table 2 illustrates exemplary records containing RAT data.

TABLE 2

| IP Address | Identity (Phone# or IMSI) | Radio Access Technology (RAT) | PLMN ID |
|---|---|---|---|
| 192.168.1.2 | 223-XXX-YYYY (Verizon), 345-XXX-YYYY (AT&T), 222-XXX-YYYY (T-Mobile) | CDMA2000 | 310-012 (Verizon) |
| 172.122.3.54 | 847-XXX-YYYY (AT&T) | UMTS | 310-090 (AT&T) |
| 172.134.44.6 | 224-XXX-YYYY (AT&T) | WiFi | Not Available |

In one embodiment, the user device interface 702 may receive a request for a current RAT of a specific user device. In response to such a request, the user device interface 702 invokes the search engine 704 to find the requested RAT in the central RAT data store 706, and then provides the requested RAT to the requestor (e.g., a user device or another cloud server). The central RAT data store 706 may represent a single data structure or multiple data structures (tables, databases, repositories, files, etc.) residing on one or more mass storage devices, such as magnetic or optical storage based disks, solid-state drives or hard drives.

The user device interface 702 may also receive voice call data identifying a calling user device, a called user device, a RAT to be used for a voice call from the calling user device to the called user device and optionally a PLMN to be used for this voice call. The user device interface 702 may receive the voice call data from the calling user device, from another server (e.g., another cloud server) or from a network operator. In response, the user device interface 702 may send a notification of the incoming voice call to the called user device, specifying the RAT and optionally the PLMN to be used for the incoming voice call. Alternatively, the user device interface 702 may determine that it is not connected to the called user device, may identify another server that is connected with the called user device and may forward the voice call data to the other server. In one embodiment, prior to sending a notification to the called user device, the user device interface 702 may determine whether the current RAT of the called user device is the same as the RAT to be used for the incoming voice call. If so, the user device interface 702 refrains from sending the notification. If not, then the user device interface 702 does send the notification to the called user device.

FIGS. 8 and 9 are flow diagrams of some embodiments of client-side methods. The methods are performed by processing logic that may comprise hardware (circuitry, dedicated logic, etc.), software (such as is run on a general purpose computer system or a dedicated machine), or a combination of both. In some embodiments, the methods are performed by a user device (e.g., a RAT subsystem 108 of user device 102 of FIG. 1).

FIG. 8 is a flow diagram of one embodiment of a method 800 for preparing to an incoming voice call. At block 802, a called user device receives a notification of an incoming voice call. The notification may include an identifier (e.g., the phone number or IMSI) of a calling user device, an identifier of the called user device, a RAT to be used for the incoming voice call and a PLMN to be used for the incoming voice call. The called user device may receive the notification from a server (e.g., a cloud server) connected with the called user device.

At block 804, the called user device turns on a RAT receiver associated with the specified RAT. In one embodiment, the called user device first determines if the specified RAT is the same as the current RAT of the called user device. If so, method 800 ends. If not, the called user device turns on the RAT receiver associated with the specified RAT.

At block 806, the called user device searches a local data store for cell data obtained during a prior PLMN scan at the current location of the called user device. If the local data store includes such cell data (block 808), the called user device camps on a corresponding cell to be able to receive the incoming voice call (block 810). If the local data store does not include such cell data, the called user device performs a PLMN scan to find a cell available at the current location of the called user device and corresponding to the specified PLMN (block 812), records data identifying the found cell in the local data store (block 814) and camps on the found cell to be able to receive the incoming voice call (block 810).

FIG. 9 is a flow diagram of one embodiment of a method 900 for initiating a voice call. At block 902, a calling user device identifies a current RAT of a called user device by requesting the current RAT of the called user device from a cloud server connected with the calling user device.

At block 904, the calling user device determines what RAT should be used for the voice call based on the RAT of the called user device and/or other factors (e.g., cost efficiency, quality of service, etc.). At block 906, the calling user device causes the called user device to be notified of the RAT to be used for the voice call. The calling user device may accomplish this by notifying the server of the RAT and optionally the PLMN to be used for the voice call. At block 908, the calling user device initiates the voice call.

Figure 10:
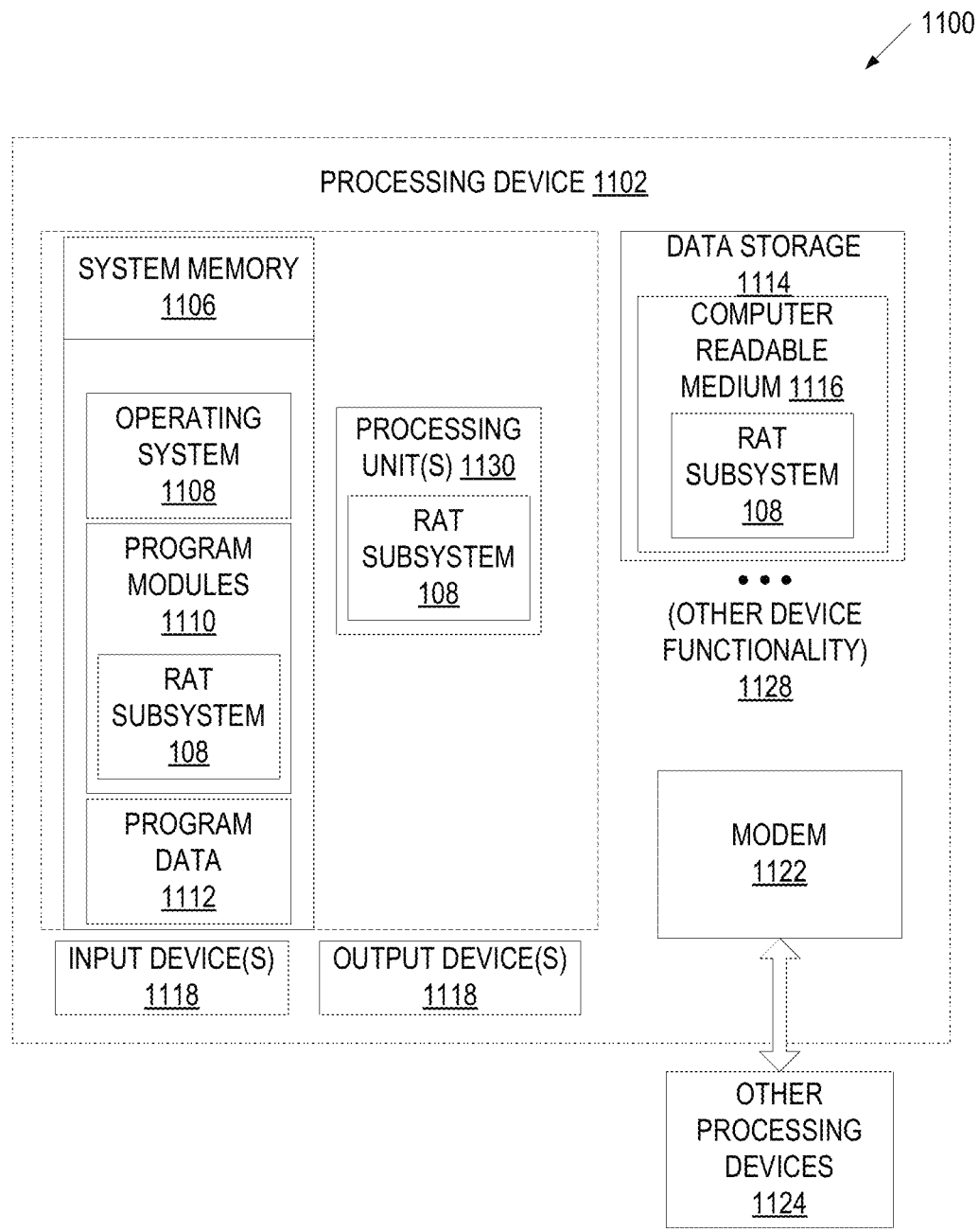
FIG. 10 is a block diagram illustrating an exemplary user device.

FIG. 10 is a flow diagram of one embodiment of a method 1000 for a cloud notification to a user device of an incoming voice call. The method is performed by processing logic that may comprise hardware (circuitry, dedicated logic, etc.), software (such as is run on a general purpose computer system or a dedicated machine), or a combination of both. In some embodiments, the method is performed by a cloud server (e.g., server 104 of FIG. 1).

Referring to FIG. 10, the cloud server maintains RAT data of various user devices communicatively coupled with the cloud server (block 1002). The RAT data may include an IP address of a user device, an identifier of the user device, a current RAT of the user device and optionally a current PLMN of the user device. The cloud server may receive RAT data from a user device each time the RAT and/or PLMN of the user device changes.

At block 1004, the cloud server receives a request for a RAT of a user device. The request may be received from another user device or from another cloud server. At block 1006, the cloud server provides the RAT of the user device to the requestor. Alternatively, if the cloud server is not connected to the user device whose RAT is being requested, the cloud server may identify another cloud server that is connected to this user device and may forward the request to the other cloud server.

At block 1008, the cloud server receives the RAT and optionally the PLMN to be used for a voice call to the user device. The cloud server may receive the RAT and PLMN to be used for the voice call from a calling user device, a network operator of the calling user device or another cloud server.

At block 1010, the cloud server causes the called user device to be notified of the RAT and PLMN that will be used for the incoming voice call. The cloud server may achieve this by notifying the called user device or by passing this information to the other server associated with the called user device, which will then send a notification to the called user device.

Figure 11:
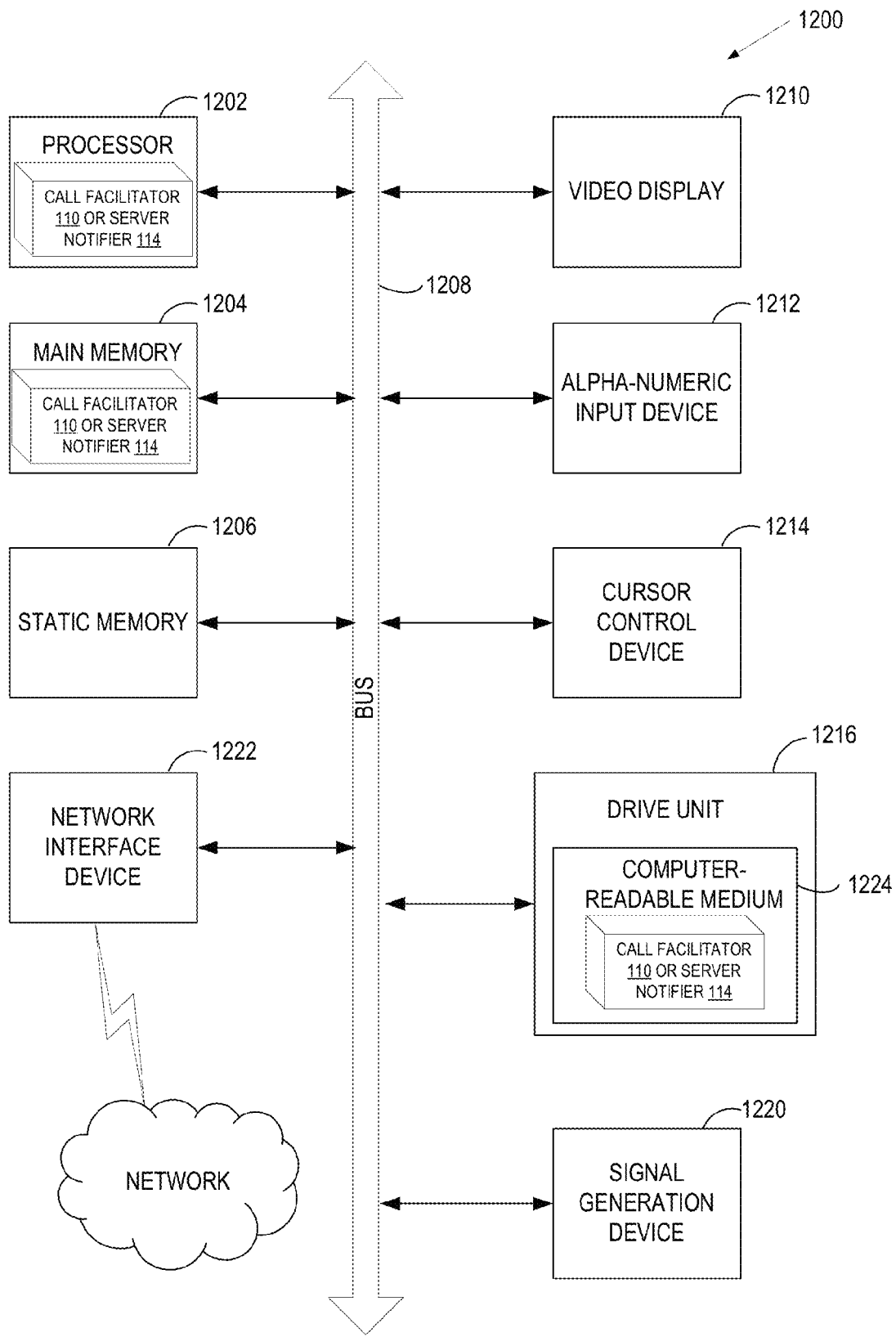
FIG. 11 illustrates an exemplary server assisting in notifying a user device of an incoming voice call.

FIG. 11 is a block diagram illustrating an exemplary user device 1100. The user device 1100 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 1100 includes one or more processing units 1104, such as one or more CPUs. The user device 1100 also includes system memory 1106, which may correspond to any combination of volatile and/or non-volatile storage mechanisms. The system memory 1106 may store information which provides an operating system component 1108, various program modules 1110 including RAT subsystem 108, program data 1112, and/or other components. The user device 1100 performs functions by using the processing unit(s) 1104 to execute the RAT subsystem 108 and other instructions provided by the system memory 1106.

The user device 1100 may also include a data storage device 1114 that may consist of one or more types of removable storage and/or one or more types of non-removal storage. The data storage device 1114 may include a computer-readable medium 1116 on which is stored one or more sets of instructions (e.g., instructions of the RAT subsystem 108) embodying any one or more of the methodologies or functions described herein. As shown, instructions of the RAT subsystem 108 may also reside, completely or at least partially, within the system memory 1106 and/or within the processing unit(s) 1130 during execution thereof by the user device 1100, the system memory 1106 and the processing unit(s) 1130 also constituting computer-readable media. The instructions of the RAT subsystem 108 may further be transmitted or received over a network.

The user device 1100 may also include one or more input devices 1118 (keyboard, mouse device, specialized selection keys, etc.) and one or more output devices 1120 (displays, printers, audio output mechanisms, etc.). The user device 1100 may further include a wireless modem 1122 to allow the user device 1100 to communicate via a wireless network with other computing devices 1124, such as remote computers, the server 104, and so forth. The wireless modem 1122 may allow the user device 1100 to receive a voice call and also communicate with the server 104 in a data mode. The wireless modem 1122 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 1100. As indicated by the label "Other Device Functionality" 1128, the user device 1100 may include additional functions.

FIG. 12 illustrates an exemplary server 1200 that assists in preferred network scans. The server 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing system (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1206.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute the call facilitator 110 or the server notifier 114 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a computer-readable medium 1224 on which is stored one or more sets of instructions (e.g., instructions of the call facilitator 110 or the server notifier 114) embodying any one or more of the methodologies or functions described herein. The call facilitator 110 or the server notifier 114 may also reside, completely or at least partially, within the main memory 1204 and/or within the processor 1202 during execution thereof by the computer system 1200, the main memory 1204 and the processor 1202 also constituting computer-readable media. The call facilitator 110 or the server notifier 114 may further be transmitted or received over a network 1220 via the network interface device 1222.

While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "searching", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processing device of a first user device, a first radio access technology (RAT) of a plurality of radio access technologies (RATs) based on information received from a first server associated with a first cloud service, the first RAT to be used for a user communication to a second user device
   causing the second user device to be notified of the identified first RAT based on sending a message to the first server, wherein the message is to cause the first server to send a notification of the identified first RAT to at least one of the second user device or a second server that communicates with the second user device, wherein the notification is to be sent to the second user device using a second RAT that is a current RAT of the second user device;
   initiating, by the processing device of the first user device, the user communication with the second user device on the identified first RAT;
   receiving, by the processing device of the first user device, a user request to establish a voice communication with the second user device; and
   determining a status of the second user device by the first user device based on querying the first server, the status comprising the current RAT of the second user device, wherein the information received from the first server comprises the status of the second user device,
   wherein identifying the first RAT comprises applying one or more RAT selection criteria that are used to select the first RAT based on at least one of the status of the second user device or a status of the first user device.

2. The method of claim 1 wherein causing the second user device to be notified of the identified first RAT comprises:
   providing data specifying the identified RAT to the first server, wherein the first server or the second server is to provide the data specifying the identified first RAT to the second user device, and wherein the data causes the second user device to activate a receiver associated with the identified first RAT and to deactivate an additional receiver associated with the second RAT.

3. The method of claim 2 further comprising:
   responsive to a change of at least one of a current RAT of the first user device or a current network of the first user device, providing at least one of a new RAT or a new network to the first server, wherein the plurality of RATs comprise Wi-Fi and at least one of a second generation wireless telephone technology (2G technology), a third generation wireless telephone technology (3G technology) or a fourth generation wireless telephone technology (4G technology).

4. The method of claim 1 wherein causing the second user device to be notified of the identified RAT comprises:
   notifying the first server associated with the first user device of the identified first RAT, wherein the first server is to provide data specifying the identified first RAT to the second server associated with the second user device and the second server is to provide the data specifying the identified first RAT to the second user device.

5. The method of claim 4 further comprising:
   responsive to a change of at least one of a current RAT of the first user device or a current network of the first user device, providing data specifying at least one of a new RAT or a new network to the first server.

6. The method of claim 1 further comprising:
   receiving a status pertaining to receipt of communications by the second user device from the first server or the second server.

7. The method of claim 6, wherein the received status of the second user device comprises a call acceptance criterion, the method further comprising:
   determining whether the call acceptance criterion is satisfied; and
   initiating the communication with the second user device responsive to determining that the call acceptance criterion is satisfied.

8. The method of claim 1, further comprising:
   determining whether a criterion is satisfied based on the status of the second user device, wherein the user communication comprises the voice communication responsive to determining that the criterion is satisfied and the user communication comprises a written communication responsive to determining that the criterion is not satisfied.

9. The method of claim 1, wherein the first server comprises a virtual machine that is independent of a network operator that operates a wireless network associated with the user communication.

10. A user device comprising:
    a memory; and
    a processing device operatively coupled to the memory, the processing device to:
      identify one of a plurality of RATs to be used for a user communication to a second user device based on information received from a first server associated with a first cloud service;
      cause the second user device to be notified of the identified RAT based on sending a message to the first server, wherein the message is to cause the first server to send a notification to at least one of the second user device or a second server that communicates with the second user device of the identified RAT, wherein the notification is to be sent to the second user device using a current RAT of the second user device;
      initiate the user communication with the second user device on the identified RAT;
      receive a user request to establish a voice communication with the second user device; and determine a status of the second user device based on querying the first server, the status comprising the current RAT of the second user device, wherein the information received from the first server comprises the status of the second user device, wherein identifying the first RAT comprises applying one or more RAT selection criteria that are used to select the first RAT based on at least one of the status of the second user device or a status of the user device.

11. The user device of claim 10, wherein the processing device is further to:

determine a RAT of the second user device; and use the RAT of the second user device when identifying the RAT to be used for the user communication.

12. The user device of claim 10, wherein causing the second user device to be notified of the identified RAT comprises:

providing data specifying the identified RAT to the first server, wherein the first server or the second server is to provide the data specifying the identified RAT to the second user device, and wherein the data causes the second user device to activate a receiver associated with the identified RAT and to deactivate an additional receiver not associated with the identified RAT.

13. The user device of claim 12, wherein the processing device is further to:

provide at least one of a new RAT or a new network to the first server responsive to a change of at least one of a current RAT of the user device or a current network of the user device.

14. The user device of claim 10 wherein causing the second user device to be notified of the identified RAT comprises:

notifying the first server associated with the user device of the identified RAT, wherein the first server is to provide data specifying the identified RAT to the second server associated with the second user device and the second server is to provide the data specifying the identified RAT to the second user device.

15. The user device of claim 14, wherein the processing device is further to:

provide data specifying at least one of a new RAT or a new network to the first server responsive to a change of at least one of a current RAT of the user device or a current network of the user device.

16. The user device of claim 10, wherein the processing device is further to:

receive a status pertaining to receipt of communications by the second user device from the first server or the second server.

17. The user device of claim 16, wherein the received status of the second user device comprises a call acceptance criterion, and wherein the processing device is further to:

determine whether the call acceptance criterion is satisfied; and initiate the communication with the second user device responsive to determining that the call acceptance criterion is satisfied.

18. A non-transitory computer readable storage medium having instructions encoded thereon that, when executed by a processing device of a first user device, cause the processing device to perform operations comprising:

identifying, by the processing device, one of a plurality of radio access technologies (RATs) to be used for a user communication to a second user device based on information received from a first server associated with a first cloud service;

causing the second user device to be notified of the identified RAT based on sending a message to the first server, wherein the message is to cause the first server to send a notification of the identified RAT to at least one of the second user device or a second server that communicates with the second user device, wherein the notification is to be sent to the second user device using a current RAT of the second user device;

initiating, by the processing device, the user communication with the second user device on the identified RAT;

receiving, by the processing device, a user request to establish a voice communication with the second user device; and determining a status of the second user device by the first user device based on querying the first server, the status comprising the current RAT of the second user device, wherein the information received from the first server comprises the status of the second user device, wherein identifying the first RAT comprises applying one or more RAT selection criteria that are used to select the first RAT based on at least one of the status of the second user device or a status of the first user device.

19. The non-transitory computer readable storage medium of claim 18, the operations further comprising:

determining, by the processing device, a RAT of the second user device; and using the RAT of the second user device when identifying the RAT to be used for the user communication.

20. The non-transitory computer readable storage medium of claim 18, wherein causing the second user device to be notified of the identified RAT comprises:

providing data specifying the identified RAT to the first server, wherein the first server or the second server is to provide the data specifying the identified RAT to the second user device, and wherein the data causes the second user device to activate a receiver associated with the identified RAT and to deactivate an additional receiver not associated with the identified RAT.

21. The non-transitory computer readable storage medium of claim 20, the operations further comprising:

responsive to a change of at least one of a current RAT of the first user device or a current network of the first user device, providing at least one of a new RAT or a new network to the server.

22. The non-transitory computer readable storage medium of claim 18, wherein causing the second user device to be notified of the identified RAT comprises:

notifying the first server associated with the first user device of the identified RAT, wherein the first server is to provide data specifying the identified RAT to the second server associated with the second user device and the second server is to provide the data specifying the identified RAT to the second user device.

23. The non-transitory computer readable storage medium of claim 22, the operations further comprising:

responsive to a change of at least one of a current RAT of the first user device or a current network of the first user device, providing data specifying at least one of a new RAT or a new network to the first server.

24. The non-transitory computer readable storage medium of claim 18, the operations further comprising:

receiving a status pertaining to receipt of communications by the second user device from the first server or the second server.

25. The non-transitory computer readable storage medium of claim 24, wherein the received status of the second user device comprises a call acceptance criterion, the method, the operations further comprising:
  determining whether the call acceptance criterion is satisfied; and
  initiating the communication with the second user device responsive to determining that the call acceptance criterion is satisfied.

\* \* \* \* \*